Oct. 23, 1962    R. C. SNEPVANGERS    3,060,281
PHONOGRAPH PICKUP CARTRIDGE
Filed April 1, 1960    2 Sheets-Sheet 1
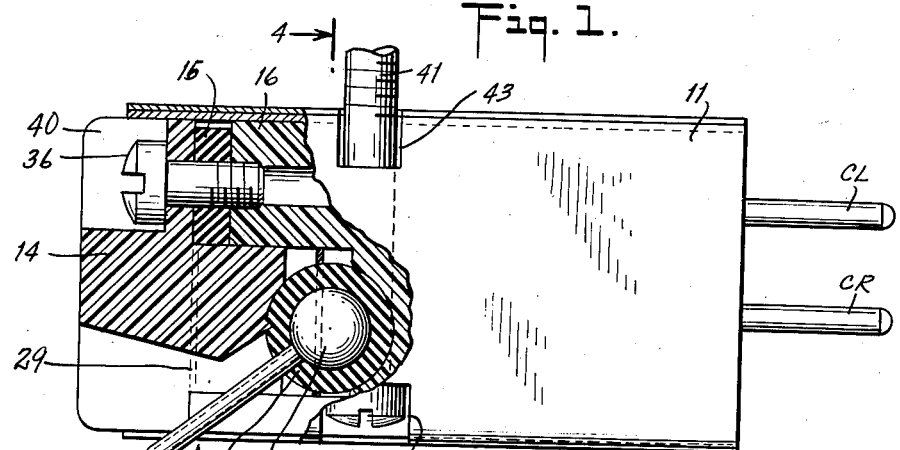
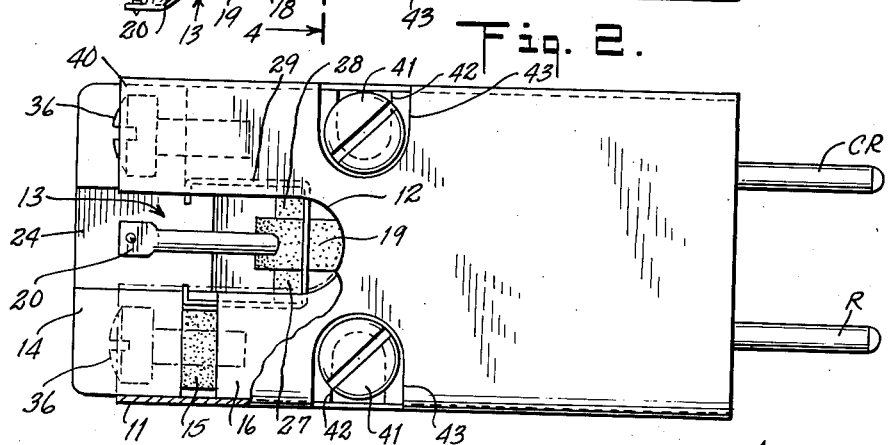
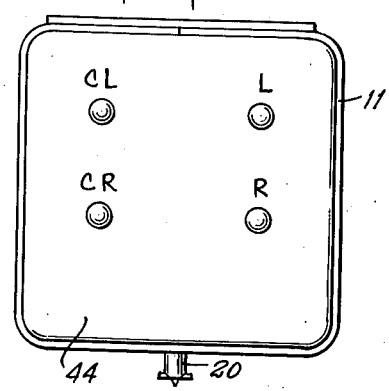
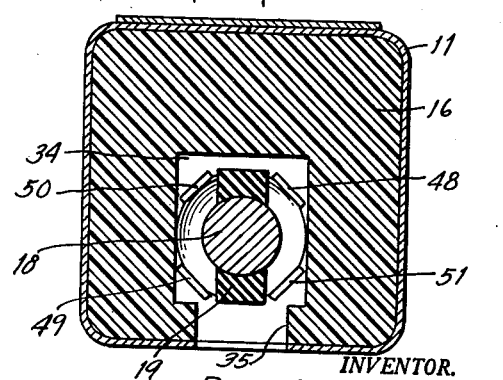
INVENTOR.
RENE C. SNEPVANGERS
BY
Darby & Darby
ATTORNEYS

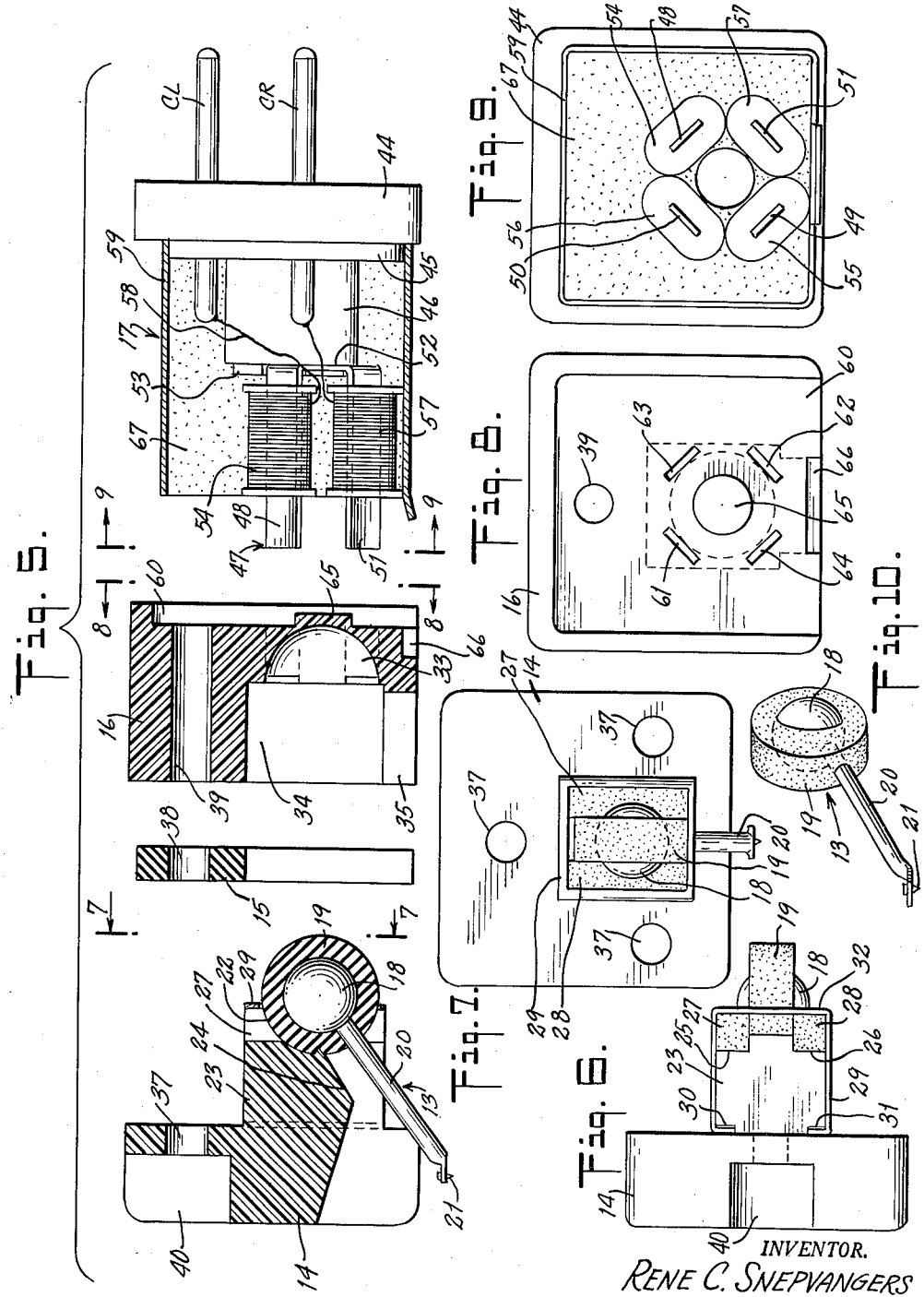

United States Patent Office 3,060,281
Patented Oct. 23, 1962

3,060,281
PHONOGRAPH PICKUP CARTRIDGE
Rene C. Snepvangers, Croton-on-Hudson, N.Y., assignor to Fairchild Recording Equipment Corporation, Long Island City, N.Y., a corporation of New York
Filed Apr. 1, 1960, Ser. No. 19,206
15 Claims. (Cl. 179—100.41)

This invention relates to phonograph pickup cartridges and more particularly to improvements in stereophonic phonograph pickup cartridges of the magnetodynamic type.

The copending patent application of Rein Narma, Serial No. 859,968, filed December 16, 1959, discloses a phonograph pickup cartridge of the magnetodynamic type adapted for use with both stereophonic and monophonic phonograph records. In this type of phonograph pickup cartridge, magnetic core means are provided to form first and second magnetic flux paths having mutually perpendicular and intersecting portions. Movable magnet means, such as a spherical permanent magnet, for example, having a magnetic axis perpendicular to the plane of the intersecting flux path portions is rotatably mounted at the intersection of the flux path portions, so that no flux is induced in either of the magnetic flux paths when the magnet is in its neutral or undeflected position. An angular type of stylus arm serves to couple the stylus to the spherical magnet to rotate the magnet about its geometric center in accordance with the modulations in a record groove. The permanent magnet is encased in a spherical cushion formed of a material having high compliance and mechanical damping characteristics and the cushion is mounted on suitable support means, so that the permanent magnet is rotatable about its geometric center. Finally, separate pickup coils are arranged for both of the separate magnetic flux paths formed by the core means, so that the variations in flux in each of the paths may be independently sensed. When the cartridge is oriented so that the magnetic axis of the spherical magnet is parallel to the plane of the record and each of the intersecting flux path portions of the core means is parallel to one wall of a stereophonic record groove of the "45–45" type, the modulations in one wall of the groove will rotate the magnet to cause corresponding flux variations in one of the magnetic flux paths and the other wall of the record groove will rotate the magnet to cause corresponding flux variations in the other of the magnetic flux paths, so that the cartridge provides a true, two-channel stereo output. The spherical cushion serves to provide a restoring couple to maintain the permanent magnet in its neutral or undeflected position and also to provide mechanical damping for the cartridge to substantially reduce the effective mass and record material compliance resonance in the audio frequency range.

While the above-described phonograph pickup cartridge performs satisfactorily for most applications, it has been found desirable to eliminate certain difficulties associated with the stylus suspension system. The first difficulty encountered is the lack of separately controlled damping for the vertical and lateral motions of the stylus. This is quite important if maximum channel separation and freedom from cross-talk, especially at the higher frequencies, is to be obtained. The spherical cushion surrounding the permanent magnet in the cartridge of the above-described copending patent application tends to provide equal damping for the cartridge for all directions of motion of the stylus, and therefore does not permit separate, independent control of vertical and lateral damping. The second difficulty encountered with the stylus suspension system relates to the stylus arm itself. In general, stylus arms must be rigid enough to transmit the desired motion of the stylus to the movable magnet without appreciable loss over a wide range of frequencies to insure maximum output and peak-free response. Furthermore, any resonances of the stylus arm must be above the audio frequency range, so that the output of the cartridge is free from distortion. In stereophonic systems, where the modulations in the "45–45" walls of the record groove are translated into vertical and lateral components of motion, the stylus arm must have good "compliance," the reciprocal of stiffness or rigidity, in all directions of movement to insure satisfactory reproduction of both channels. Stylus arms of the angular type having a substantially V-shaped cross section, such as employed in the above-described cartridge, for example, and stylus arms of the "flat plate" type are often unsatisfactory for stereo reproduction because the frequency response curves of such stylus arms are not "flat" enough over the entire audio frequency range.

Accordingly, it is an object of this invention to provide an improved stylus suspension system for phonograph pickup cartridges.

It is a further object of this invention to provide an improved stylus suspension system for stereophonic phonograph pickup cartridges of the magnetodynamic type such as the cartridge disclosed in the aforementioned copending patent application of Rein Narma, for example.

Briefly, the invention contemplates mounting the rotatable permanent magnet of the cartridge in a vertically disposed annular damping ring formed of a material having high compliance and mechanical damping characteristics to provide damping for the vertical components of motion of the stylus. A pair of damping blocks formed of a material having high compliance and mechanical damping characteristics are disposed on opposite sides of the magnet in contact with the sides of the magnet at spaced points along a line perpendicular to the plane of the damping ring, so that the blocks provide independent damping for the lateral components of motion of the stylus. The improved stylus suspension system of the invention also includes a straight, tubular stylus arm having thin walls and formed of a light-weight material for coupling the stylus to the magnet. Since the stylus extends below the stylus arm, a torque is applied to the arm by the motion of the stylus in the record groove, which may create an undesirable torsional resonance. The tubular stylus arm, however, provides high vertical and lateral compliance and avoids the undesirable torsional resonance encountered with stylus arms of the angular and flat plate types, to thereby insure maximum output and peak-free response over a wide range of frequencies.

In the drawings:
FIG. 1 is a side view of a phonograph pickup cartridge constructed in accordance with the teachings of the invention, a portion of the housing of the cartridge being broken away to reveal certain details of construction;
FIG. 2 is a bottom view of the cartridge of FIG. 1 with a portion of the housing broken away to reveal details of construction;
FIG. 3 is a rear view of the cartridge of FIG. 1;
FIG. 4 is a sectional view taken along the line 4—4 of FIG. 1;
FIG. 5 is an exploded side sectional view of the cartridge of FIG. 1 with the housing removed;
FIG. 6 is a top view of the clamping block assembly of FIG. 5 showing certain details of the damping arrangement;
FIG. 7 is a view taken along the line 7—7 of FIG. 5;
FIG. 8 is a view taken along the line 8—8 of FIG. 5;
FIG. 9 is a view taken along the line 9—9 of FIG. 5; and
FIG. 10 is a perspective view of a portion of the stylus suspension system showing the annular damping ring.

Referring now to FIGS. 1 and 2 of the drawings, there is shown a phonograph pickup cartridge of the type disclosed in the aforementioned copending patent application of Rein Narma. As seen therein, the cartridge comprises an open-ended housing or casing 11 having a substantially square cross-section. The housing 11 is preferably formed of a magnetic material, such as Mu-Metal, for example, so that it functions as a magnetic shield to shield the pickup coils of the cartridge from stray magnetic fields. The bottom surface of the housing is formed with an open-ended slot 12 to receive the stylus assembly 13. The portions of the cartridge mounted within housing 11 may best be seen in the exploded view of FIG. 5 of the drawings as comprising a clamping block 14, stylus assembly 13, gasket 15, receptacle 16 and contact block assembly 17. The stylus assembly 13, as seen in FIGS. 1, 2, 5 and 10 of the drawings, comprises a spherical permanent magnet 18, to which is secured by any convenient means, such as cementing, for example, the upper end of a tubular stylus arm 20. The lower end of the tubular stylus arm 20 is formed with a flat, substantially horizontally disposed portion in which the stylus 21 is mounted by suitable means, such as cementing, for example. An annular damping ring 19 is vertically disposed around the spherical magnet 18 in close frictional contact therewith for reasons which will be described hereinafter. The stylus arm 20 is a straight tubular structure with thin walls and should be fabricated of a light-weight material, such as aluminum or magnesium, for example. As hereinbefore explained, a stylus arm of this construction offers high vertical and lateral compliance as well as a minimum torsional resonance to insure maximum output and peak-free response over a wide range of audio frequencies. In practice, the permanent magnet 18 may be formed of a suitable magnetic material, such as "Indox V," for example, and is oriented so that its magnetic axis is parallel to the plane of the phonograph record and lies in a plane passing through the stylus arm 20. The stylus 21 is usually formed by a diamond or other hard surfaced material.

The arrangement for supporting the stylus assembly 13 may be seen in FIGS. 1, 2, 4, 5, 6 and 7 of the drawings. As seen therein, the annular damping ring 19 is supported and positioned by the clamping block 14 and the receptacle 16. Clamping block 14, which may be formed of a plastic, for example, is substantially square-shaped in cross-section and is adapted to fit within the housing 11 of the cartridge. A longitudinally extending projection 23 of the clamping block is formed with a recessed portion 22 to engage a portion of one side of the annular damping ring. The lower surface 24 of the clamping block is cut away to provide clearance for mechanical movement of the stylus arm 20. The longitudinally extending projection 23 of the clamping block is formed with vertically extending shoulders 25 and 26 to respectively seat damping blocks 27 and 28. A magnet holder 29, which may be formed of brass, for example, is positioned on the longitudinally extending projection 23 of the clamping block as shown in FIGS. 6 and 7 of the drawings and is held in place by vertically extending slots 30 and 31 formed in the projection 23. An opening, or "window" 32 is formed in the rear surface of the magnet holder 29 to receive the annular damping ring 19 in tight frictional engagement to prevent rotation thereof. If desired, the annular ring may also be cemented to the clamping block 14 in the recessed portion 22. Magnet holder 29 also serves to securely support the damping blocks 27 and 28, so that the inner sides of the blocks are in frictional contact with the sides of the spherical magnet 18.

By virtue of this arrangement, it may be seen that the magnet 18 is free to rotate in any direction about its geometric center under the action of stylus 21. The annular damping ring 19 and the damping blocks 27 and 28 provide a restoring couple to maintain the stylus in its neutral or undeflected position. Additionally, they support the magnet for rotation about its geometric center and perform damping functions. For these reasons, the damping ring and damping blocks should be fabricated of material having high compliance and mechanical damping characteristics, such as butyl rubber, for example. It may be noted that the vertically disposed damping ring performs the function of damping the vertical components of motion of the stylus 21. Since the damping blocks 27 and 28 are in frictional contact with the sides of the magnet at spaced points along a line perpendicular to the plane of the damping ring 19, they act to damp the lateral components of motion of the stylus. Accordingly, by controlling the characteristics of the material of the damping ring and damping blocks and by controlling the contact of these members with the spherical magnet 18, it is possible to independently control the vertical and lateral damping of the cartridge to insure good channel separation and freedom from cross-talk at the higher frequencies.

The receptacle 16, which may be fabricated of a plastic, for example, is formed with a recessed portion 33 to engage the other side of the damping ring 19 when the cartridge is assembled. A chamber 34 is formed in the receptacle to receive the magnet holder assembly, while a longitudinally extending opening 35 is formed in the bottom portion of the receptacle to permit free movement of the stylus arm 20. Screws 36 are provided to pass through openings 37 formed in the clamping block and openings 38 formed in the substantially "U-shaped" gasket 15 to threadedly engage openings 39 formed in the receptacle 16 to thereby insure a secure assembly within the housing 11 of the cartridge. The front of the clamping block 14 may be formed with recess portions 40 to accommodate the heads of the mounting screws 36. As seen in FIGS. 1 and 2 of the drawings, the assembled cartridge may be secured to the turntable arm of the record playing equipment by means of mounting screws 41 which pass through vertically extending recessed portions 42 of the receptacle 16 and openings 43 formed in the top and bottom of the housing 11. If desired, the assembled clamping block and receptacle may be further secured to the inside of the housing 11 by any convenient means, such as by cementing, for example.

The contact block assembly 17 of the cartridge, as seen in FIGS. 3, 5 and 9 of the drawings, comprises a substantially square-shaped contact block 44 having an inwardly extending shoulder 45 formed thereon. The contact block may be fabricated of plastic and has a longitudinally extending projection 46 formed on the shoulder 45 to mount the magnetic core structure 47 of the cartridge. The magnetic core structure 47 is essentially a "cruciform" type of core structure and comprises four horizontally extending arm portions 48, 49, 50 and 51, which are integral with a vertically disposed base portion 52. The base portion 52 of the core structure may be secured to the projection 46 by any convenient means, such as a mounting screw (not shown), for example. In order to prevent accidental rotation of the core structure 47 and to facilitate assembly of the unit, a small boss 53 is formed on the inner surface of projection 46 to engage one of the vertices of the cross-shaped base portion 52. If desired, a notched spacer, such as illustrated in the aforementioned patent application of Rein Narma, may be secured to the base portion 52 of the core structure to accurately space and support the arm portions 48—51.

From the foregoing description, it may be seen that arm portions 48 and 49 of the magnetic core structure 47, in conjunction with the air gap between the free ends of these arm portions, form a first closed magnetic flux path, while arm portions 50 and 51, in conjunction with the air gap between the free ends of these arm portions, form a second closed magnetic flux path. It will be noted that the separate magnetic flux paths lie in mutually perpendicular planes, each plane being inclined 45° from the plane of the record surface, and that the air gap portions of the pair of flux paths intersect each other and are perpendicular to each other. Furthermore, the spherical permanent magnet 18 is located at the intersection of the air gap portions of the pair of magnetic flux paths formed by the arm portions, so that its magnetic axis is substantially parallel to each of the arm portions and spaced equidistantly therefrom. Accordingly, when the movable magnet 18 is in its neutral or undeflected position, no flux exists in either of the closed magnetic flux paths formed by the arms, since all of the lines of flux pass directly from the north pole of the magnet to the south pole of the magnet. However, when the magnet 18 is rotated from its neutral position by movement of stylus 21, the balanced flux pattern is upset and flux will exist in either or both of the separate magnetic flux paths, depending upon the direction of movement of the magnet 18.

In order to sense changes in the flux induced in the pair of magnetic flux paths formed by the arm portions of the core structure, pickup coils are provided on the arm portions. Pickup coils 54 and 55 are respectively located on arm portions 48 and 49, while pickup coils 56 and 57 are respectively located on arm portions 50 and 51. By connecting the pickup coils associated with a particular flux path in series-circuit, two separate electrical outputs representing the flux changes in the pair of flux paths may be provided. As seen in FIGS. 5 and 9 of the drawings, the coils 54 and 55 may be connected together to provide an output representing the flux variations in the magnetic flux path formed by arm portions 48 and 49, while coils 56 and 57 may be interconnected to provide an output representing the flux variations in the path formed by arm portions 50 and 51. In order to connect the electrical outputs associated with each flux path to the turntable arm, the coils are connected by leads 58 to connecting pins CL, CR, L and R which pass through the contact block 44 to the outside of the housing. As explained in the aforementioned copending patent application of Rein Narma, pins CR and R are each connected to an end of one set of serially-connected coils and pins CL and L are each connected to an end of the other set of serially-connected coils to provide two separate output channels.

Since the coils forming each pair of pickup coils are connected in an "astatic" arrangement, the pickup due to stray magnetic fields is effectively minimized. Additionally, since the housing 11 of the cartridge constitutes a magnetic shield, the pickup due to stray flux from non-homogeneous magnetic fields is also reduced. Provision is also made to shield the pickup coils from electrostatic fields. This is accomplished by the use of a shield 59 of electrically conductive material, such as copper, for example. One end of the shield is seated on the shoulder 45 formed on the contact block 44 and may be cemented in place thereon. The other end of the shield is seated in a recessed portion 60 formed in the adjacent surface of receptacle 16, so that the shield surrounds the pickup coils over their entire length. Preferably, the copper shield 59 is connected to ground by a grounding strip (not shown) coupled to the connecting pin CR.

When the contact block assembly 17 is assembled inside the cartridge housing, the free ends of the arm portions 48—51 of the magnetic core structure pass through slots 61, 62, 63 and 64 formed in the receptacle 16 and are disposed around the permanent magnet 18 as shown in FIG. 4 of the drawings. While the pickup coils are supported and positioned by the arm portions of the magnetic core structure 47, additional support is provided by a circular boss 65 located on the adjacent surface of receptacle 16. The boss 65 is spaced equidistantly from the slots 61—64, so that when the cartridge is assembled, the inner surfaces of the pickup coils rest on the boss. A recessed portion 66 is formed in the bottom surface of the receptacle to engage the lower edge of the shield 59 when the cartridge is assembled. Finally, the space between the shield 59 and the assembled magnetic core structure and coils is filled with a suitable wax-like potting compound 67, such as Ceresin, for example, for the usual protection purposes.

In describing the operation of the phonograph pickup cartridge of the invention, it will be assumed that the cartridge is employed with a stereophonic record. Since the walls of the stereophonic record groove are each inclined at an angle of 45° with respect to the horizontal plane of the record surface and the magnetic core structure 47 forms two separate magnetic flux paths each lying in a plane inclined 45° from the horizontal, the information contained in one wall or channel of the record may be sensed by one of the magnetic flux paths and the information contained in the other channel sensed by the other magnetic flux path. For example, looking towards the front of the cartridge from a position in front of the cartridge when the inner wall only of the record groove is modulated, it causes a movement of the stylus 21 which tends to rotate the magnet 18 about its geometric center in the plane passing through arm portions 48 and 49 of the magnetic core structure. Accordingly, a flux is induced in the closed flux path formed by arm portions 48 and 49 and is converted to corresponding electric signals by the pickup coils 54 and 55. However, since the rotational movement of the spherical magnet 18 is about an axis lying in the plane of arm portions 50 and 51 of the core structure, no voltage is induced in pickup coils 56 and 57. Similarly, should only the outer wall of the record groove be modulated, an electric signal would be produced in pickup coils 56 and 57, but not in coils 54 and 55. Accordingly, it is seen that each pair of pickup coils is responsive to the modulations on a single wall of the record groove so that stereophonically recorded information may be sensed.

When both walls of the record groove are modulated, the resulting motion of the stylus 21 is complex and may be broken down into separate vertical and lateral components of motion representing the modulations in each channel. The vertical damping provided by annular ring 19 and lateral damping provided by damping blocks 27 and 28 provide independently adjustable mechanical damping for the cartridge and have the effect of substantially reducing the effective mass and record material compliance resonance in the audio frequency range. When it is desired to use the cartridge with monophonic phonograph records, pins CL and CR may be connected together by a simple jumper connection and pins L and R interconnected by another jumper, so that the serially-connected pickup coils 54 and 55 are connected in parallel with serially-connected coils 56 and 57. With these connections, both sets of pickup coils contribute to the output of the cartridge and provide a single channel output. In this regard, it may be noted that the independent adjustment of damping afforded by the novel stylus suspension system of the invention is also of great value for providing the proper vertical and lateral compliance necessary for good monophonic reproduction.

It is believed apparent that many changes could be made in the above construction and many apparently widely different embodiments of the invention made without departing from the scope thereof. For example, the magnet 18 could be cubical rather than spherical, and the damping members 19, 27 and 28 assume other forms than those illustrated. Furthermore, it will be understood that the novel stylus suspension system of the invention is not limited to use in stereophonic cartridges of the magnetodynamic type, but may obviously be extended to monophonic pickups or to pickups of the electrodynamic or variable reluctance types. Accordingly, it is intended that all matter contained in the above description or shown in the accompanying drawings shall be interpreted as illustrative and not in a limiting sense.

What is claimed is:

1. In a phonograph pickup cartridge having at least stylus, pickup coil, magnetic core and magnet elements, a stylus suspension system comprising coupling means for coupling said stylus element to one of said remaining elements for movement thereof in response to the modulations in a record groove, first damping means in frictional engagement with said one remaining element for damping vertical components of motion of said stylus element, said first damping means being formed of a material having high compliance and mechanical damping characteristics, second damping means in frictional engagement with said one remaining element for damping lateral components of motion of said stylus element, said second damping means being formed of a material having high compliance and mechanical damping characteristics, and mounting means in frictional engagement with said first and second damping means for supporting and positioning said first and second damping means and said one remaining element, to permit movement of said one remaining element in response to movements of said stylus element.

2. A stylus suspension system as claimed in claim 1, wherein one of said first and second damping means comprises a substantially flat damping member having an opening formed therein adapted to receive said one remaining element.

3. A stylus suspension system as claimed in claim 2, wherein the other of said first and second damping means comprises a pair of damping blocks disposed at opposite ends of said opening in said flat damping member.

4. A stylus suspension system as claimed in claim 1, wherein one of said first and second damping means comprises a substantially flat annular damping ring surrounding said one remaining element and the other of said first and second damping means comprises a pair of rectangular damping blocks disposed on opposite sides of said one remaining element and contacting said one remaining element at spaced points along a line perpendicular to the plane of said damping ring.

5. A stylus suspension system as claimed in claim 4, wherein said mounting means comprises a pair of co-engaging clamping blocks having recessed portions formed therein to receive said damping ring and said damping blocks.

6. A stylus suspension system as claimed in claim 5, wherein said coupling means comprises a straight, tubular stylus arm having thin walls and formed of a light-weight material.

7. In a phonograph pickup cartridge of the magnetodynamic type having a magnetic core structure, pickup coil means associated with said core structure and a stylus-actuated permanent magnet, the combination comprising first and second independently operable damping means in frictional contact with said magnet for respectively damping the vertical and lateral components of motion of the stylus, said damping means being formed of material having high compliance and mechanical damping characteristics, and support means in frictional contact with said damping means for supporting and positioning said damping means and said magnet.

8. The combination claimed in claim 7, wherein one of said first and second damping means comprises a substantially flat damping member having an opening formed therein to receive said magnet, and the other of said damping means comprises a pair of damping blocks disposed on opposite sides of said magnet in contact with said magnet at spaced points along a line perpendicular to the plane of said damping member.

9. The combination claimed in claim 8, wherein said magnet is a spherical magnet and said damping member comprises an annular ring.

10. The combination claimed in claim 8, wherein said magnet is a cubical magnet and said damping member comprises an annular ring.

11. In a stereophonic phonograph pickup cartridge of the magnetodynamic type having a magnetic core structure, pickup coil means associated with said core structure, a magnet rotatable about the geometric center thereof and a stylus, a stylus suspension system including a straight, tubular stylus arm having thin walls and formed of a light-weight material, for mechanically coupling said stylus to said magnet for rotating said magnet in response to the modulations in a record groove.

12. In a phonograph pickup cartridge of the magnetodynamic type having magnetic core means forming first and second closed magnetic flux paths having mutually perpendicular and intersecting portions, first and second pickup coil means respectively linking said first and second flux paths, movable magnet means located at the intersection of said flux path portions and having a magnetic axis passing through said intersection perpendicular to the plane of said intersecting flux path portions, and stylus means adapted to rotate said magnet means about the geometric center thereof in response to the modulations in a record groove, the combination comprising a substantially flat damping member having an opening formed therein to receive said magnet means in close frictional contact, said damping member being formed of a material having high compliance and mechanical damping characteristics and being disposed in a plane passing through the magnetic axis of said magnet means and bisecting the angle formed by said intersecting flux path portions, so that said damping member acts to damp the vertical components of motion of said stylus means, a pair of damping blocks formed of a material having high compliance and mechanical damping characteristics disposed on opposite sides of said magnet means in frictional contact with said magnet means at spaced points along a line perpendicular to the plane of said damping member, for damping the lateral components of motion of said stylus means, and support means in engagement with said damping member and damping blocks for supporting and positioning said damping member and damping blocks, to permit rotation of said magnet means.

13. The combination claimed in claim 12, wherein said damping member is an annular ring.

14. The combination claimed in claim 13, wherein said support means comprises a pair of clamping blocks having recessed portions formed therein to receive said damping ring and damping blocks, and a holder secured to one of said clamping blocks and having an opening formed therein to tightly engage said damping ring to prevent rotation thereof.

15. The combination claimed in claim 14, further comprising a straight, tubular stylus arm having thin walls and being formed of a light-weight material for connecting said stylus means to said magnet means.

References Cited in the file of this patent

UNITED STATES PATENTS 2,025,388    Henning _____ Dec. 24, 1935

FOREIGN PATENTS 688,804    Great Britain _____ Mar. 11, 1953